United States Patent
Nieberger

(12) 
(10) Patent No.: US 6,242,896 B1
(45) Date of Patent: Jun. 5, 2001

(54) CONVERTING AVAILABLE ELECTRICAL POWER TO DESIRABLE ELECTRICAL POWER

(75) Inventor: Mathew A. Nieberger, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/692,999

(22) Filed: Oct. 20, 2000

(51) Int. Cl.[7] .................................................. G05F 1/56
(52) U.S. Cl. ........................ 323/285; 323/225; 323/284; 323/299
(58) Field of Search ..................................... 323/222, 223, 323/224, 225, 271, 282, 284, 285, 299 301

(56) References Cited

U.S. PATENT DOCUMENTS

| | | | | |
|---|---|---|---|---|
| 4,631,470 | * | 12/1986 | Bingley | ................................. 323/282 |
| 5,929,615 | * | 7/1999 | D'Angelo et al. | ................... 323/224 |

* cited by examiner

Primary Examiner—Jessica Han
(74) Attorney, Agent, or Firm—Tuan V. Ngo

(57) ABSTRACT

Techniques are disclosed for converting available electrical power to desirable electrical power. One embodiment of the techniques calls for a boost circuit to convert low power $W_{in}$ at a terminal $T_{Vin}$ to high power $W_{out}$ at a terminal $T_{Vout}$. The boost circuit includes a voltage generation circuit, a capacitor $C_{store}$, a timing-control generator, and a boost regulator. The voltage generation circuit converts voltage $V_{in}$ at terminal $T_{Vin}$ to voltage $V_{store}$ at a terminal $T_{Vstore}$ wherein, in one embodiment, $V_{store}$ is less than $V_{in}$. Further, the current $I_{charge}$ provided by the voltage generation circuit at terminal $T_{Vstore}$ is less than the current $I_{in}$ at terminal $T_{Vin}$. In one embodiment, capacitor $C_{store}$, being charged by current $I_{charge}$, stores necessary charge to provide appropriate currents and voltages to the boost regulator. The timing-control generator uses voltages $V_{in}$ and $V_{store}$ to provide a timing-control signal $T_{control}$, which controls the timing operation of the boost regulator. In one embodiment, $T_{control}$ resets the boost regulator until capacitor $C_{store}$ accumulates enough charge to provide appropriate power to the load at terminal $T_{vout}$ through the boost regulator. The boost regulator, when in operation, converts $V_{store}$ to $V_{out}$.

3 Claims, 8 Drawing Sheets

CONVERTING AVAILABLE ELECTRICAL POWER TO DESIRABLE ELECTRICAL POWER

FIELD OF THE INVENTION

The present invention relates generally to electrical power and, more specifically, to converting available power to desirable power.

BACKGROUND OF THE INVENTION

Electrical power supplies are widely used in daily activities. Each of a refrigerator, a television, a VCR, a computer, a computer peripheral, etc., requires electrical power supplies. Depending on the needs of each of these appliances, the consumed power varies in different modes of operation. For example, a computer in a "power saved" mode or a camcorder in a "standby" mode does not draw as much current as in an operational mode. Similarly, a computer disk drive generally demands a current higher than normal to spin up its motor in a startup mode. To properly manage the power, many approaches require that an operating system include information and intelligence to determine the startup time so that the system power may then be rationed to other devices and thus reserved for the disk drive. Such approaches may also require an additional power supply to be used when the high power is needed. However, a power management system both by itself and with additional power supplies is costly and adds undesirable complexity to the system. Consequently, it is clearly desirable that mechanisms be provided to solve the above deficiencies.

SUMMARY OF THE INVENTION

Techniques are disclosed for converting available electrical power to desirable electrical power. One embodiment of the techniques calls for a boost circuit to convert low input power $W_{in}$ at a terminal $T_{Vin}$ to high output power $W_{out}$ at a terminal $T_{Vout}$. Those skilled in the art will recognize that the electrical power at a terminal is the product of the voltage and the current at that same terminal. The boost circuit comprises a voltage generation circuit, a capacitor $C_{store}$, a timing-control generator, and a boost regulator. The voltage generation circuit converts voltage $V_{in}$ at terminal $T_{Vin}$ to voltage $V_{store}$ at a terminal $T_{Vstore}$ wherein, in one embodiment, $V_{store}$ is less than $V_{in}$. Further, the current $I_{charge}$ provided by the voltage generation circuit at terminal $T_{Vstore}$ is less than the input current $I_{in}$ available at terminal $T_{Vin}$. In one embodiment, capacitor $C_{store}$, being charged by current $I_{charge}$, stores necessary charge to provide appropriate currents and voltages to the boost regulator.

The timing-control generator uses voltages $V_{in}$ and $V_{store}$ to provide a timing-control signal $T_{control}$, which controls the timing operation of the boost regulator. In one embodiment, $T_{control}$ sets and resets the boost regulator. Resetting the boost regulator prevents it from performing its operation while setting it allows its normal function. In one embodiment, $T_{control}$ resets the boost regulator until capacitor $C_{store}$ accumulates enough charge to provide appropriate power to the load at terminal $T_{Vout}$. The boost regulator, when in operation, converts voltage $V_{store}$ to voltage $V_{out}$. In one embodiment, the boost circuit converts $V_{in}$ at 3.3V and $I_{in}$ at 1.2A to $V_{out}$ at 5.0V and $I_{out}$ at 2.A, for a predefined period.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Techniques are disclosed for converting available electrical power to desirable electrical power. In one embodiment, a circuit is used to convert low input voltage at an input terminal to high output voltage at an output terminal. In the following description, for explanation purposes, numerous specific details are set forth in order to provide a thorough understanding of the present invention. However, it will be apparent to those skilled in the art that the invention may be practiced without these specific details. In other instances, well-known structures and devices are shown in block diagram form in order to avoid unnecessarily obscuring the invention. In various embodiments, the operational values of the electrical components, such as resistors, capacitors, inductors, etc., generally vary from the specified values in which a −10% to +10% range is common. As these values are used only as examples, the invention is not limited to a particular set of values. Further, in selecting and calculating these values from mathematical equations, the efficiency of each electrical component and other efficiency factors are considered. For example, a switch may act as a resistor and thus causes voltage loss when current passes through it; a diode may have some leakage current, etc.

Figure 1:
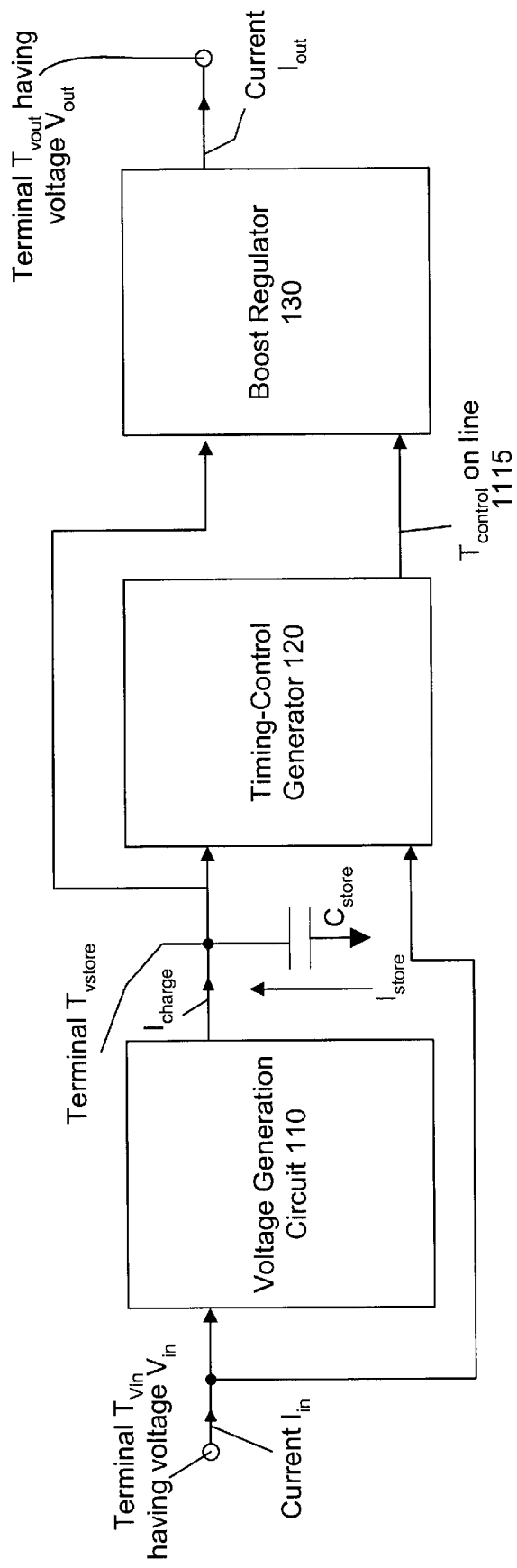
FIG. 1 shows an electrical boost circuit in accordance with one embodiment of the disclosed techniques.

FIG. 1 shows a boost circuit 100 in accordance with one embodiment. Circuit 100 includes a voltage generation circuit 110, a capacitor $C_{store}$, a timing-control generator 120, and a boost regulator 130. Circuit 100 converts voltage $V_{in}$ and current $I_{in}$ at a terminal $T_{Vin}$ to voltage $V_{out}$ and current $I_{out}$ at a terminal $T_{Vout}$. In one embodiment, $V_{out}$ is greater than $V_{in}$ and $I_{out}$ is greater than $I_{in}$. Those skilled in the art will recognize that low input voltage $V_{in}$ and low input current $I_{in}$ results in low input power because power is the product of voltage and current. Similarly, high-output voltage and high-output current results in high-output power. In one embodiment, $V_{in}$ is about 3.3V, $I_{in}$ is about 1.25A, and, for a predefined period of about 2 seconds, $V_{out}$ is about 5.0V and $I_{out}$ is about 2.0A. Additionally, circuit 100 provides $I_{out}$ as the spin-up current and $V_{out}$ as the operational supply voltage for a disk drive on a printer plug-in adapter card. In such conditions, even given a limited current $I_{in}$ and a low-voltage $V_{in}$, a system designer does not have to be concerned about the power management for the disk drive. For example, the system designer does not need to allocate the necessary spin-up current when it is needed because the converted high-voltage $V_{out}$ and high-current Iout are available for use as appropriate. It is worth noting here that the disclosed techniques are not limited to applications regarding disk drives or printers, but are applicable when it is desirable that an available electrical power be converted to a desirable electrical power. Further, voltage $V_{out}$ may not be greater than voltage $V_{in}$ and current Iout may not be greater than current $I_{in}$. In one embodiment, circuit 100 is used to spin a disk on a Universal Serial Bus wherein both $V_{in}$ and $V_{out}$ are at 5V and $I_{in}$ is limited to a maximum of 500 mA.

In one embodiment, voltage generation circuit 110 is a "BUCK" regulator with current limitation, which converts $V_{in}$ at 3.3V to a 2.2V $V_{store}$ at a terminal $T_{Vstore}$. To work with boost regulator 130, $V_{store}$ generally ranges from 1.1V to 2.2.V. In this embodiment, voltage $V_{store}$ is less than voltage $V_{in}$ to take advantage of the compact, high capacitance, and low-working-voltage capacitor $C_{store}$. In such conditions, boost regulator 130 converts low voltage $V_{store}$ to high voltage $V_{out}$, and circuit 100 well fits in a relatively small plug-in card. However, the techniques described herein are also applicable to situations in which $V_{store}$ is greater than both $V_{in}$ and $V_{out}$, which generally requires a high-voltage and high-capacitance $C_{store}$. Voltage generation circuit 110 also provide $I_{charge}$ at terminal $T_{Vstore}$. In one embodiment, the power $W_{store}$ at terminal $T_{Vstore}$ is limited to the maximum value of power $W_{in}$ minus efficiency losses so that any device using boost circuit 100 is not allowed to draw more current than the maximum of available $I_{in}$. Power $W_{store}$ is the product of voltage $V_{store}$ and current $I_{charge}$ while power $W_{in}$ is the product of voltage $V_{in}$ and current $I_{in}$. Further, $I_{in}$ used is current limited by circuit 110 to at most 1A while $I_{in}$ is available for at most 1.25A.

In one embodiment, capacitor $C_{store}$, storing charge for voltage $V_{store}$, is compact, low voltage, low effective series resistance (ESR), and high capacitance. Because $C_{store}$ is high capacitance, during discharge, $I_{store}$ is high current, which, together with $I_{charge}$, is used to provide high-output power $W_{out}$. In one embodiment, charging $C_{store}$ to the maximum value of $V_{store}$ at 2.2V takes several seconds, which is calculated by the following equations:

$$I_{store}=C_{store}*dV_{store}/dT$$

and $$Q_{store}=½C_{store}*(V_{store})^2.$$

wherein $Q_{store}$ is the charge stored in $C_{store}$ at a particular voltage $V_{store}$.

The duration for current $I_{out}$ to be at a required level, e.g., 2A, depends on the size of capacitor $C_{store}$. The bigger the capacitor $C_{store}$, the longer it takes to charge it up to the necessary level for producing $I_{out}$; however, the longer $I_{out}$ can be maintained at its needed level. In one embodiment, $C_{store}$ is about 3.3 Farad, and it takes about 2 seconds for $I_{out}$ both to be available at 2A and to maintain at 2A. Voltage $V_{out}$ maintains at 5V as long as power $W_{out}$ is less than $V_{store}* (I_{store}+I_{charge})$ minus the efficiency losses. Sizing capacitor $C_{store}$ depends on various factors including the peak of current $I_{charge}$, the drain current $I_{store}$ of the fully charged $C_{store}$, any parasitic losses and inefficiencies in buck regulator 110 and boost regulator 130, etc. In one embodiment, the peak current of $I_{charge}$ plus the drain current $I_{store}$ of the fully charged $C_{store}$ times $V_{store}$ minus any parasitic losses and inefficiencies is greater than the required peak power output of the load at terminal $T_{Vout}$. Multiplying the rate of charge depletion during a peak loading at terminal $T_{Vout}$ and the time that the load is at this peak loading period yields the maximum amount of the charge loss. In one embodiment, voltage $V_{store}$ is above the minimum of voltage $V_{in}$ when the maximum of charge loss is subtracted from the total charge of capacitor $C_{store}$. Further, the load at terminal $T_{Vout}$ generally has intervals where current $I_{out}$ pulled from boost regulator 130 is less than the peak output of circuit 100 when $C_{store}$ is removed from circuit 100. This allows re-charging capacitor $C_{store}$ after capacitor $C_{store}$ is discharged. The intervals of low power, e.g., charging $C_{store}$, and high demand power, e.g., discharging $C_{store}$ are also used to properly size $C_{store}$.

Timing-control 120, based on voltages $V_{in}$ and $V_{store}$, provides a signal $T_{control}$ on line 1115 to control the timing operation of boost regulator 130. In one embodiment, $T_{control}$, at a low logic level, resets boost regulator 130 to delay regulator 130 from starting its operation. This allows time for capacitor $C_{store}$ to acquire enough charge in order to provide the appropriate current $I_{out}$ and voltage $V_{out}$ for the required load at terminal $T_{Vout}$, e.g., to spin up the disk drive. Initially, in one embodiment, when both $V_{in}$ and $V_{store}$ start at 0V, $T_{control}$ is in the low level. $V_{in}$ then ranges from 0V to 3.3V and $V_{store}$ ranges from 0V to 2.2V. When both $V_{in}$ and $V_{store}$ reach a high level for the first time, $T_{control}$ changes to the high level, which allows boost regulator 130 to start its operation. $T_{control}$, remains in the high level for boost regulator 130 to operate as long as $V_{in}$ stays in the high level even if $V_{store}$ drops to a low level. When $V_{in}$ drops to the low level, $T_{control}$ changes to the low level, disabling boost regulator 130. In one embodiment, a high level for $V_{in}$ is above 2.7V, for $V_{store}$ is above 1.8V, and for $T_{control}$ is above 4.5V. $T_{control}$ is advantageous over numerous other approaches because it allows the ability to determine a time for boost regulator 130 to start. Without signal $T_{control}$ or timing control circuit 120, boost regulator 130 may provide power to terminal $T_{Vout}$ before enough charge is accumulated in capacitor $C_{store}$. In one embodiment, boost regulator 130 converts low voltage $V_{store}$ to high voltage $V_{out}$, and allows high current $I_{store}$ to be drawn from capacitor $C_{store}$ and current $I_{charge}$ via boost regulator 130. Alternatively, in the embodiment that voltage $V_{store}$ is greater than voltage $V_{in}$, boost regulator 130 converts high voltage $V_{store}$ to low voltage $V_{out}$.

LOW-VOLTAGE GENERATION CIRCUIT

Figure 2:
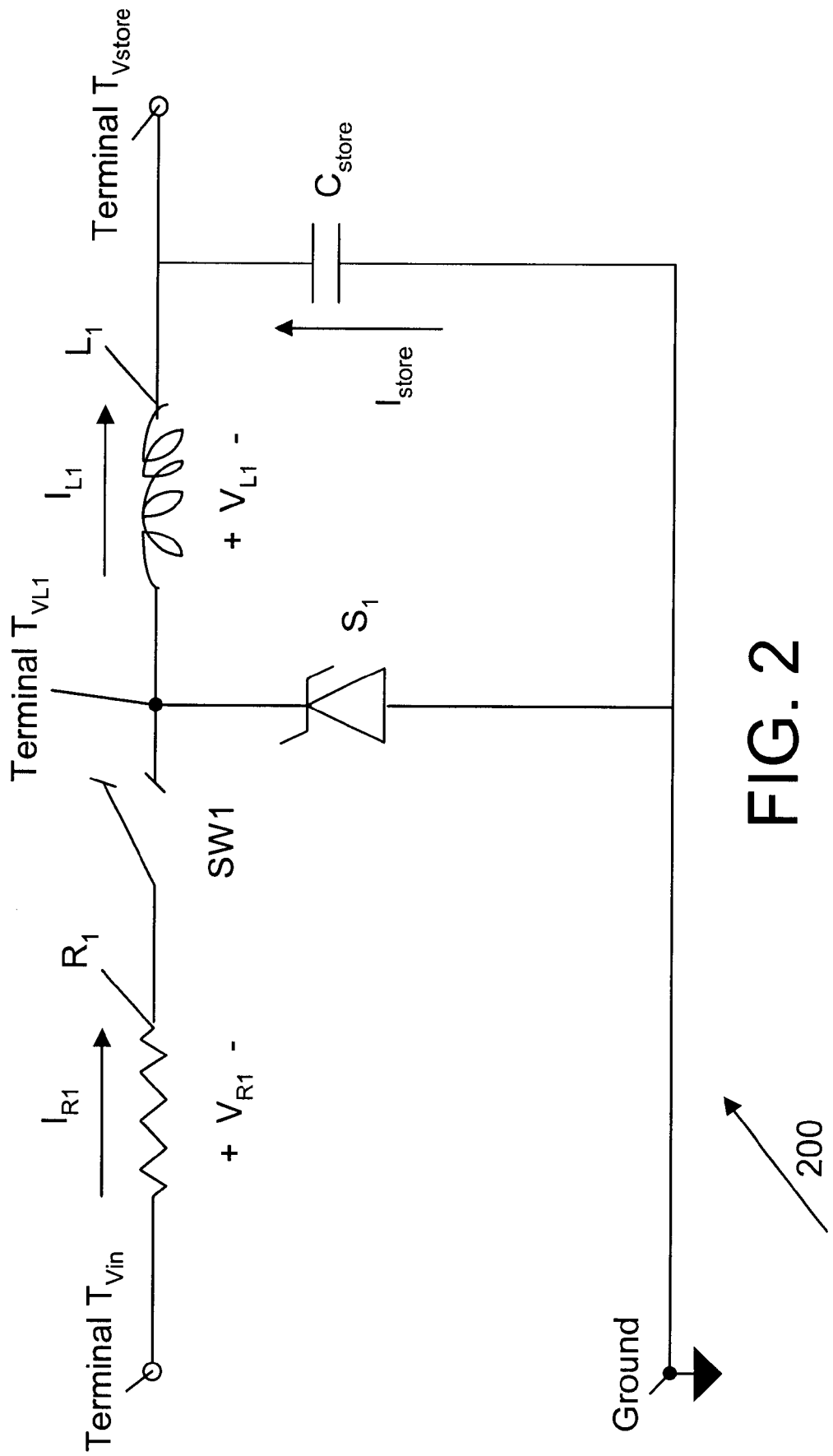
FIG. 2 shows one embodiment of the voltage generation circuit of the boost circuit of FIG. 1.

FIG. 2 shows one embodiment 200 of voltage generation circuit 110 used in conjunction with capacitor $C_{store}$. In this FIG. 2 embodiment, circuit 110 includes a resistor R1, a switch SW1, a Schottky diode S1, and an inductor L1. Closing switch SW1 allows current $I_{in}$ to flow through resistor R1 and thus inductor L1. This causes a sudden voltage change at terminal $T_{VL1}$. Because current does not change instantaneously through inductor L1, current $I_{L1}$ through L1 increases slowly, in accordance with the equation $$I_{L1}=L*(dV_{L1}/dT)$$

In one embodiment, when current $I_{L1}$ reaches a predetermined value, e.g., 1A in the example of FIG. 1, switch SW1 is open, which limits current $I_{L1}$ to that 1A value. In these conditions, inductor L1 acts as a current limiter. Alternatively, adjusting, e.g., turning on and off, the duty cycle of switch SW1 also limits current $I_{L1}$. Limiting current $I_{L1}$ in turn limits voltage $V_{L1}$, which limits voltage $V_{store}$, and consequently determines voltage $V_{out}$. As $V_{store}$ approaches a predetermined voltage level, the time that switch SW1 is closed is reduced to allow only enough current to continue flowing through inductor L1 without increasing or decreasing the average voltage and charge on capacitor $C_{store}$. At the predetermined voltage level, $V_{out}$ ripples around this level as switch SW1 is closed, current $I_{L1}$ goes both to voltage $V_{store}$ and into capacitor $C_{store}$. When switch SW1 is open, current $I_{out}$ comes from capacitor $C_{store}$ plus the decaying current $I_{L1}$. Ripple is controlled by the frequency of switch SW1.

Figure 3:
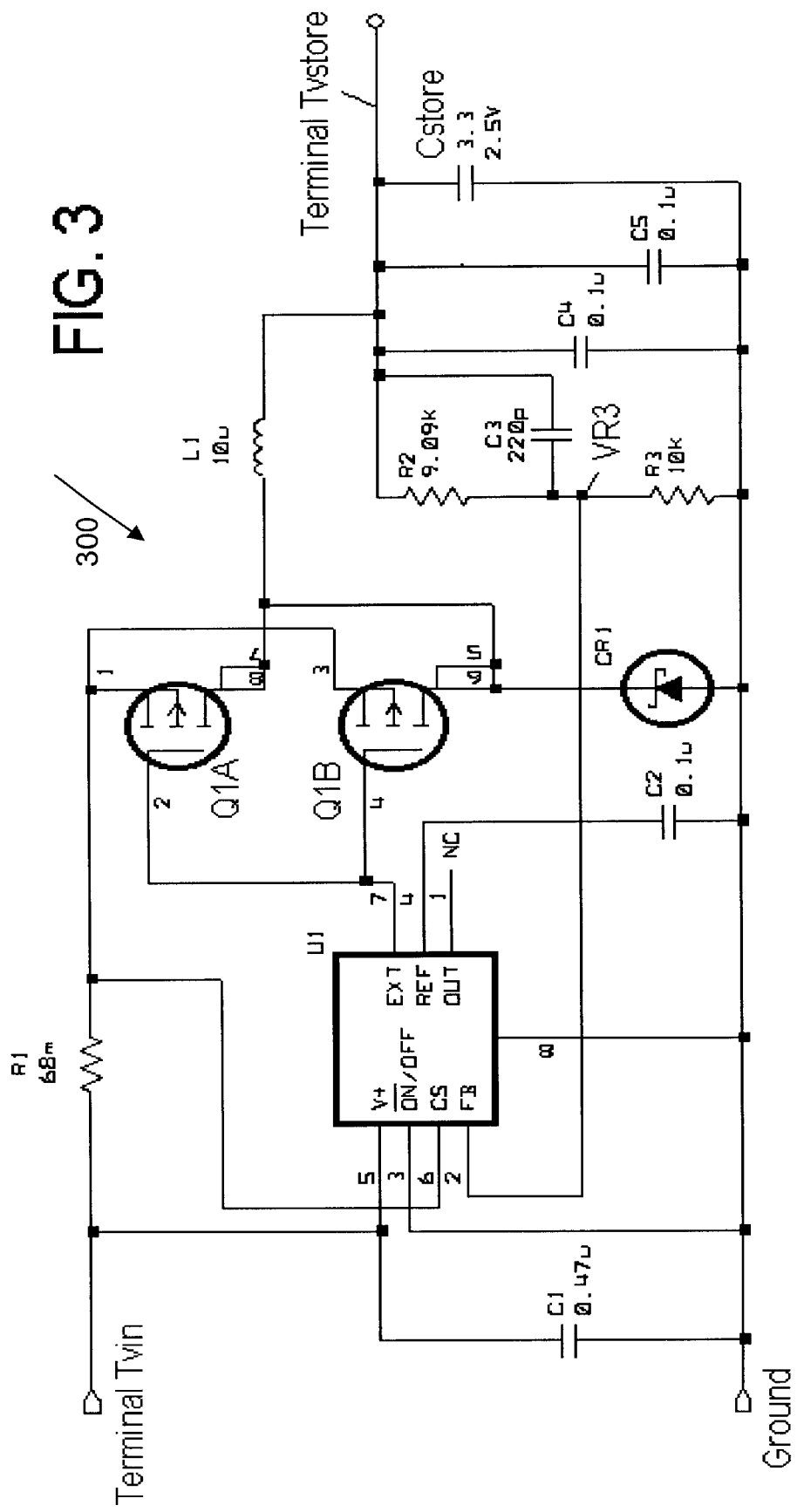
FIG. 3 shows an alternative embodiment of the voltage generation circuit of FIG. 2.

FIG. 3 shows an alternative embodiment 300 of circuit 200 that includes additional components. Either Metal-Oxide Silicon Field Effect transistor (MOSFET) $Q_{1A}$ or $Q_{1B}$ constitutes switch SW1. However, these transistors $Q_{1A}$ and $Q_{1B}$ are configured in parallel to form switch SW1 to produce a lower drain source resistance than that of either transistor $Q_{1A}$ or $Q_{1B}$. Buck regulator U1, in one embodiment a MAX1627ESA of Maxim, controls transistors $Q_{1A}$ and $Q_{1B}$. Generally, buck regulator U1 turns on or off transistors $Q_{1A}$ and $Q_{1B}$ and thus switch SW1. Current $I_{R1}$, current through resistor R1, is monitored by the control logic in buck regulator U1 to determine voltage $V_{R1}$, the voltage drop across resistor R1, and thus to determine the duty cycle of switch SW1. When current $I_{R1}$ reaches the 1A current limit, buck regulator U1 turns switch SW1 off. The feedback of $V_{store}$ via resistor R2 and capacitor C3 to pin 2 of buck regulator U1 determines the voltage level of $V_{store}$. Adjusting resistors R2 and R3 sets the reference voltage VR3, the voltage drop across resistor R3, from which $V_{store}$ is adjusted. Based on current $I_{R1}$ and voltage $V_{out}$, the duty cycle of switch SW1 is determined. Capacitor C1 provides the charge supply for buck regulator U1 to maintain a stable voltage at pin 5 of regulator U1. Capacitor C2 is an external reference for the internal circuitry of regulator U1 to monitor the current and voltage consumed by buck regulator U1. Capacitors C3, C4, and C5 filter high frequency noise for voltages at their respective nodes.

TIMING-CONTROL CIRCUIT

Figure 4:
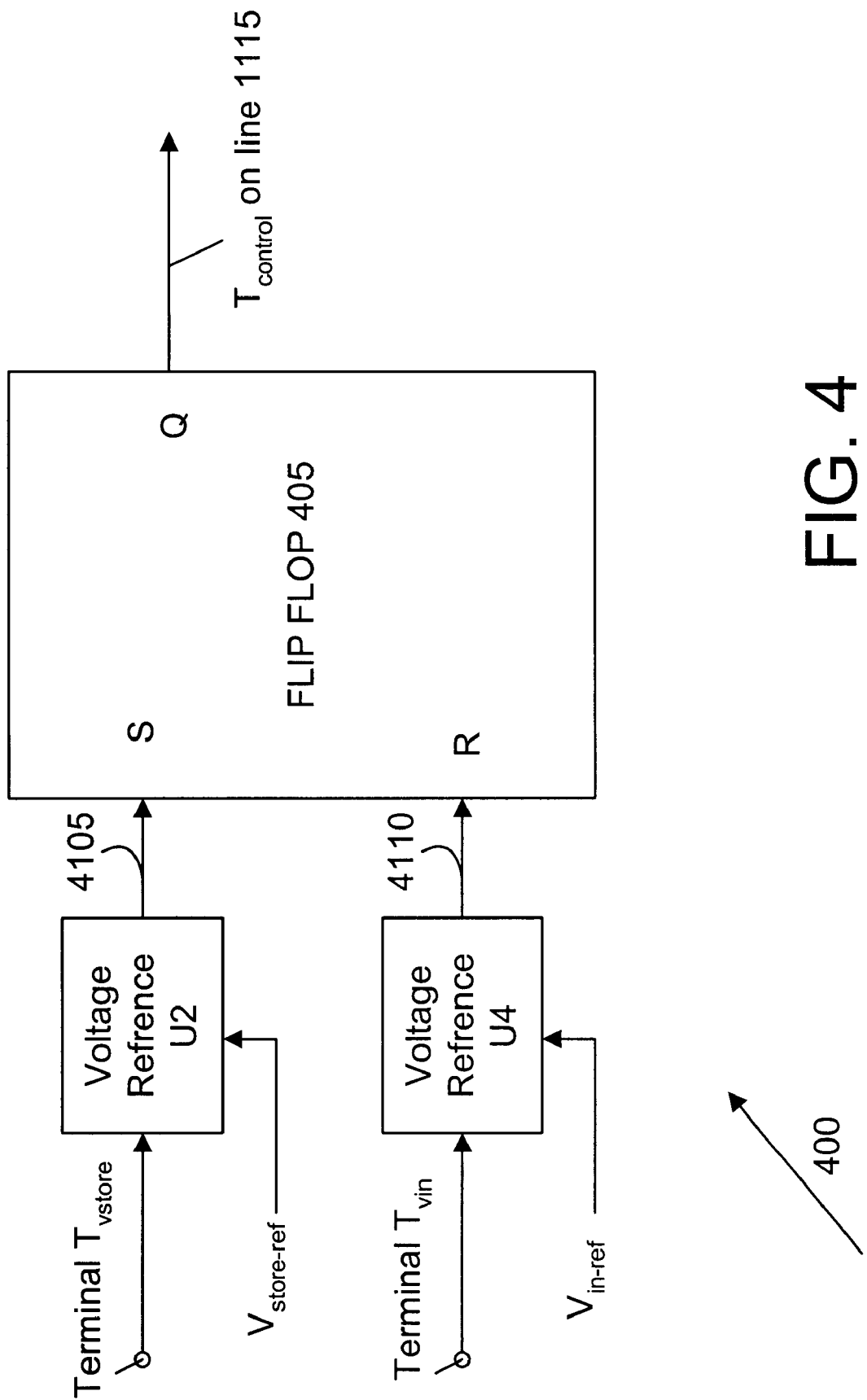
FIG. 4 shows one embodiment of the timing control of the boost circuit of FIG. 1.

FIG. 4 shows one embodiment 400 of timing-control 120 including a first voltage reference U2, a second voltage reference U4, and a set/reset flip flop 405. When $V_{store}$ reaches a predetermined voltage level $V_{store-ref}$, which, in one embodiment, is 1.8V, $V_{U2}$, output of voltage reference U2 on line 4105, changes to a logic "true." $V_{store}$ is limited to 1.8V because, in one embodiment, $C_{store}$ does not function beyond 2.5V, and it is desirable that $C_{store}$ does not receive an excessive voltage. Similarly, when $V_{in}$ reaches a predetermined voltage level $V_{in-ref}$, which, in one embodiment, is 2.7V, $V_{U4}$, output of voltage reference U4 on line 4110, changes to a logic true. In one embodiment, a logic high level indicates a logic true state. When both $V_{U2}$ and $V_{U4}$ are true, $T_{control}$ is set to a logic state to allow boost regulator 130 to start operation. In one embodiment, this logic state is a high logic state.

Figure 5:
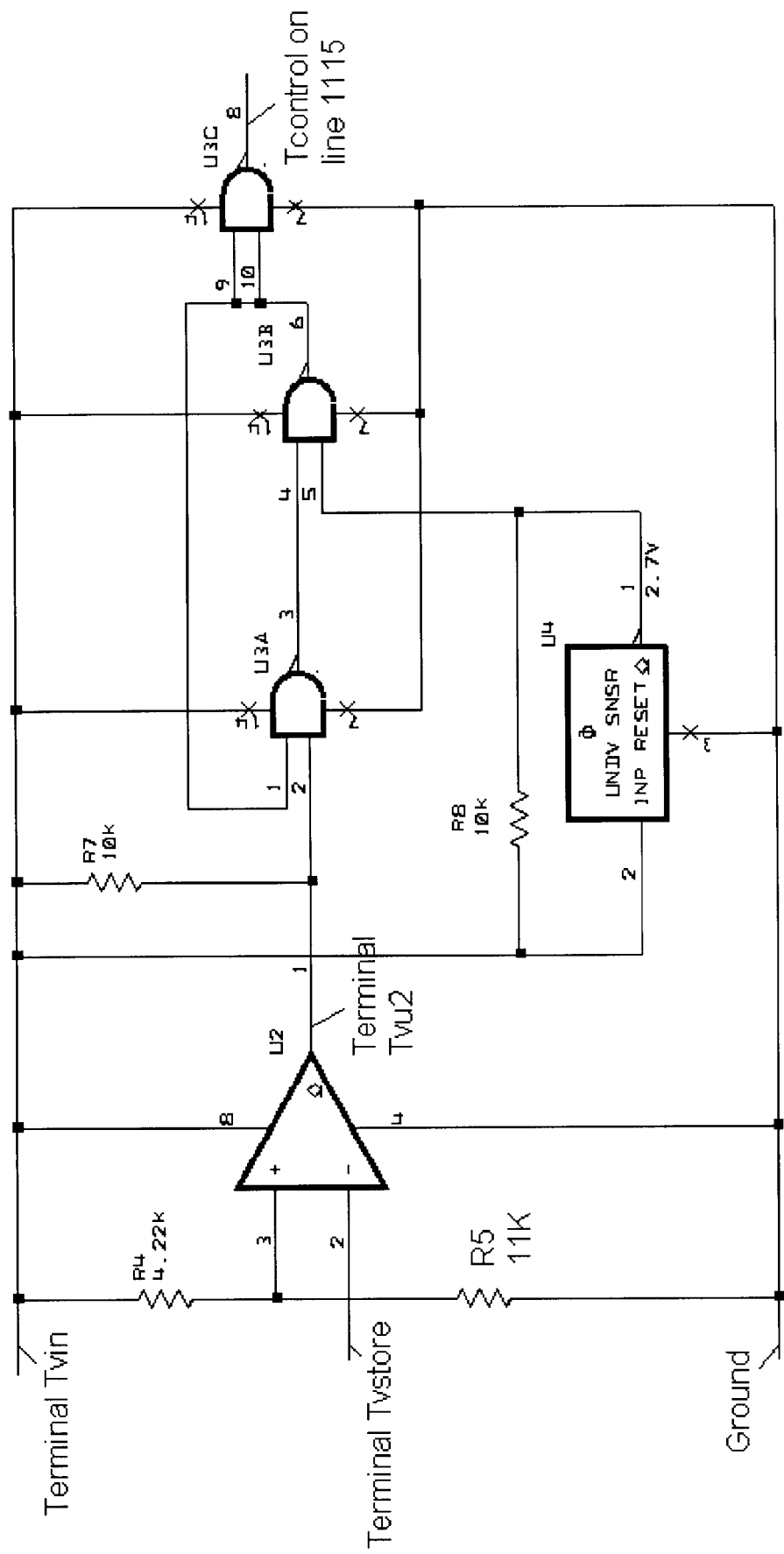
FIG. 5 shows an alternative embodiment of the timing control of FIG. 4.

FIG. 5 shows an alternative embodiment of circuit 400 having additional components. In this embodiment, a comparator LM393D serves as voltage reference U2, and a sensor MC33464N-27ATR serves as voltage reference U4. Those skilled in the art will recognize that any comparator or sensor or their equivalence may serve as voltage reference U2 or U4. NAND gates U3A, U3B, and U3C constitute flip-flop 405. Resistors R4 and R5, together with voltage $V_{in}$, provides voltage reference $V_{store-ref}$. Resistors R7 and R8 are pull-up resistors for use with open-collector outputs of comparator U2 and sensor U4. Sensor U4 internally provides voltage $V_{in-ref}$.

The feedback circuit comprising resistors R7 and R4 indicates when voltage $V_{store}$ is above voltage $V_{store-ref}$.

Accordingly, in one embodiment, a control circuit at terminal $T_{VU2}$ can be fed into a micro-controller for it to set and reset boost regulator 130, which in turns spin up and spin down the disk drive or any other desired load.

BOOST REGULATOR WITH RESET

Figure 6:
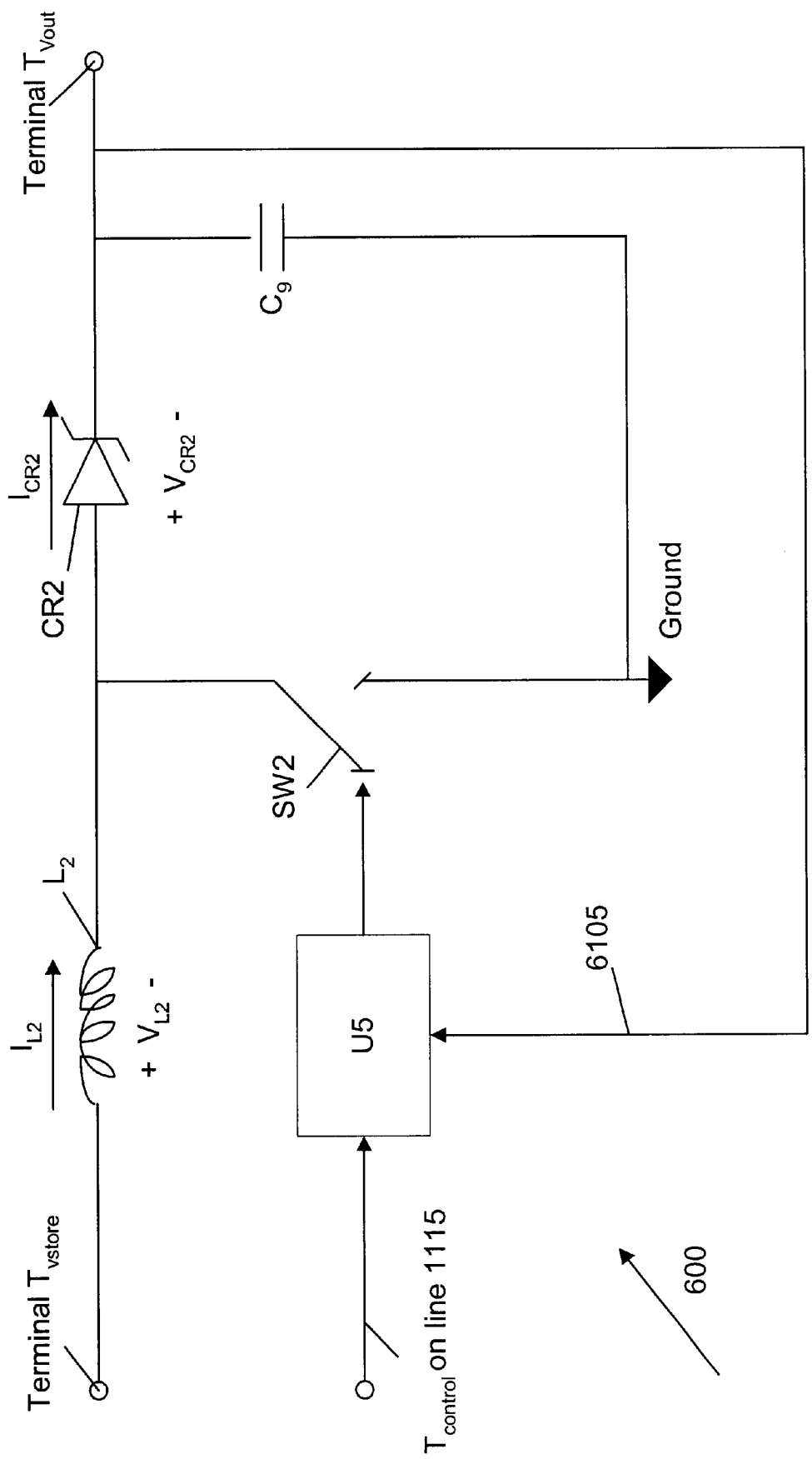
FIG. 6 shows one embodiment of the boost regulator of the boost circuit of FIG. 1.

FIG. 6 shows one embodiment 600 of boost regulator 130 having reset capability. Boost regulator 600 includes an inductor L2, a switch controller U5, a diode CR2, and a capacitor C9. In one embodiment, signal $T_{control}$ via controller U5 keeps resetting boost regulator 600 to prevent boost regulator 600 from starting operation until enough charge is accumulated in capacitor $C_{store}$. Further, boost regulator 600, when in operation, provides 5V to $V_{out}$. Pulling inductor L2 to ground and releasing it operates boost regulator 600. Closing switch SW2 to pull L2 to ground causes current IL2 to flow to ground. Releasing switch SW2 requires current $I_{L2}$ to flow through diode CR2 to charge capacitor C9 at terminal $T_{Vout}$. This is operational even though the value of $V_{store}$ may be less than that of $V_{out}$ because current $I_{L2}$ in inductor L2 cannot change instantaneously and must be released. Before switch SW2 is closed, $V_{out}$ is close to $V_{store}$ minus $V_{CR2}$, e.g., about 2V. After switch SW2 starts oscillating, $V_{out}$ ramps quickly to about 5V. This quick jump of $V_{out}$ works well with the exemplary disk drive because the drive perceives that it is turned on by a switch. As the drive is in operation, it draws current coming through circuit 100 via inductor L2, diode CR2, and energy stored in capacitor C9. The frequency and duty-cycle of switching switch SW2 determines voltage $V_{out}$ by either a) providing current $I_{CR2}$ greater than needed by the load at terminal $T_{Vout}$ to charge up capacitor C9 to a higher voltage $V_{out}$; or b) decreasing current $I_{L2}$ supplying to diode CR2 to drain charge from capacitor C9 and hence lower voltage $V_{out}$. Situation a) may be achieved by providing a large current $I_{L2}$ during switch SW2 is closed and enough time to transfer that current $I_{L2}$ to diode CR2 when switch SW is open. Situation b) may be achieved by limiting the time that switch SW2 is closed to limit current $I_{CR2}$. In one embodiment, $I_{L2}$, at 120 Khz frequency and 50% duty cycle, has a sawtooth pattern. Feedback loop on line 6105 allows adjusting either or both of the duty cycle and the frequency of current $I_{L2}$ based on voltage $V_{out}$. Diode CR2, a low-voltage Schottky diode, prevents current from flowing from terminal $T_{Vout}$ to inductor L2, maintaining $V_{out}$ at a desired voltage.

Figure 7:
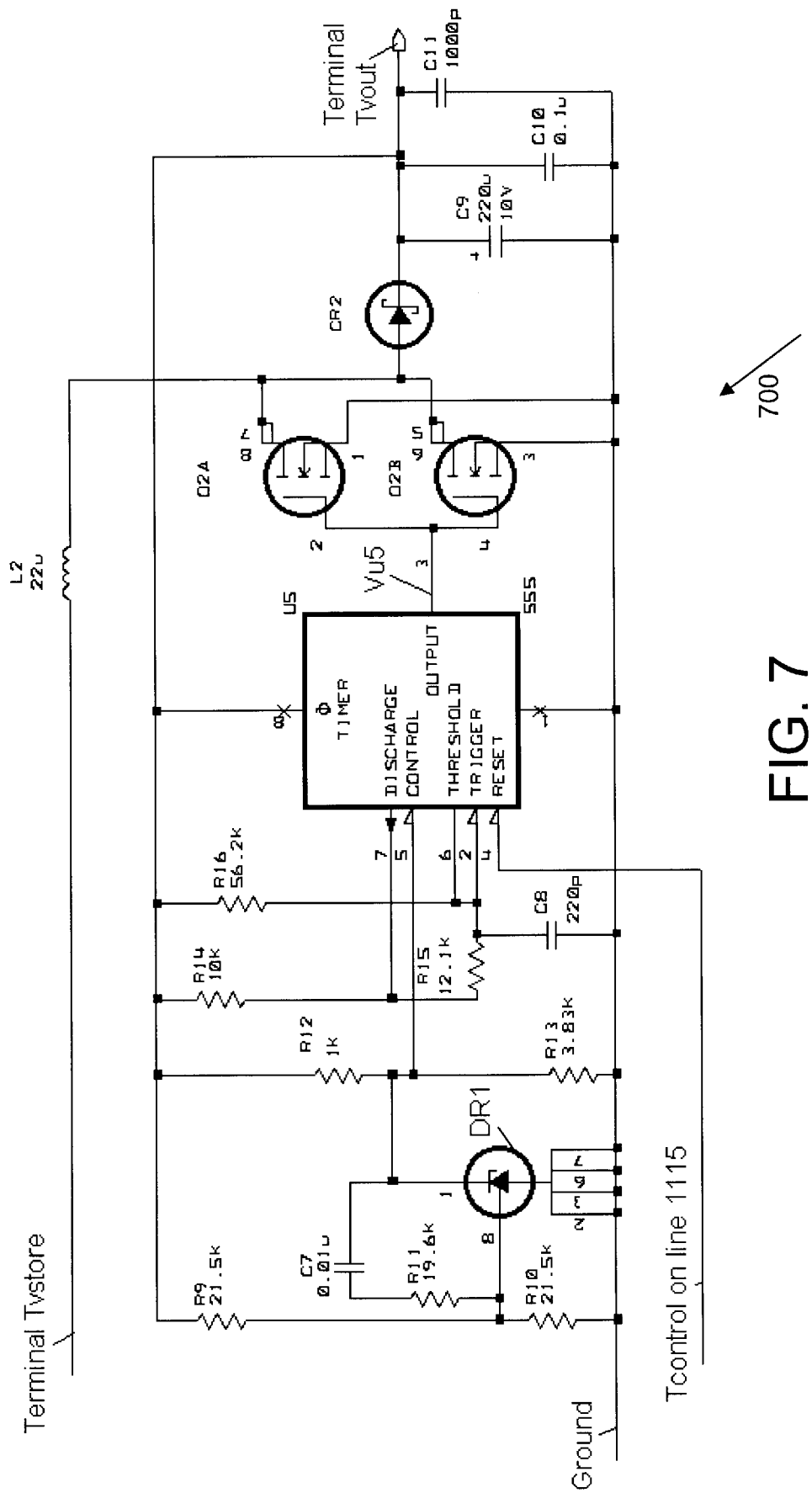
FIG. 7 shows an alternative embodiment of the boost regulator of FIG. 6.

FIG. 7 shows an alternative embodiment of boost regulator 600 having additional components. Like transistors $Q_{1A}$ and $Q_{1B}$ constituting switch SW1, transistors $Q_{2A}$ and $Q_{2B}$ constitute switch SW2. Timer U5 and diode DR1 control switch SW2, e.g., turning switch SW2 on and off. Timer U5 may be thought of as a voltage-controlled oscillator. Voltage $V_{U5}$, output of timer U5, swinging from 0 to Vout, nominally 5V, operates as a switch for switch SW2 or transistors $Q_{2A}$ and $Q_{2B}$. Voltage $V_{U5}$, at the voltage level of $V_{out}$, turns transistors $Q_{2A}$ and $Q_{2B}$ on, which provides a current path for current $I_{L2}$ of inductor L2 flowing to ground. Conversely, $V_{U5}$, at 0V, turning transistors $Q_{2A}$ and $Q_{2B}$ off, opens switch SW2 and allows current to flow through CR2. Resistors R9 and R10 together with voltage $V_{out}$ sets the voltage reference for diode DR1. Resistor R11 and capacitor C7, a compensation circuit, prevents DR1 from oscillating. DR1, a control circuit based on the reference voltage, moves the control input of timer U5, which, in one embodiment, ranges from 3.8V to 4.8V. Resistors R12 and R13 and voltage $V_{out}$, setting a voltage reference, determines the basic oscillation duty-cycle as discussed above. Resistors R14, R15, R16, and capacitor C8 set the frequency for timer U5 to turn switch SW2 on and off. Capacitors C10 and C11 filter high frequency noise at their respective nodes.

Figure 8:
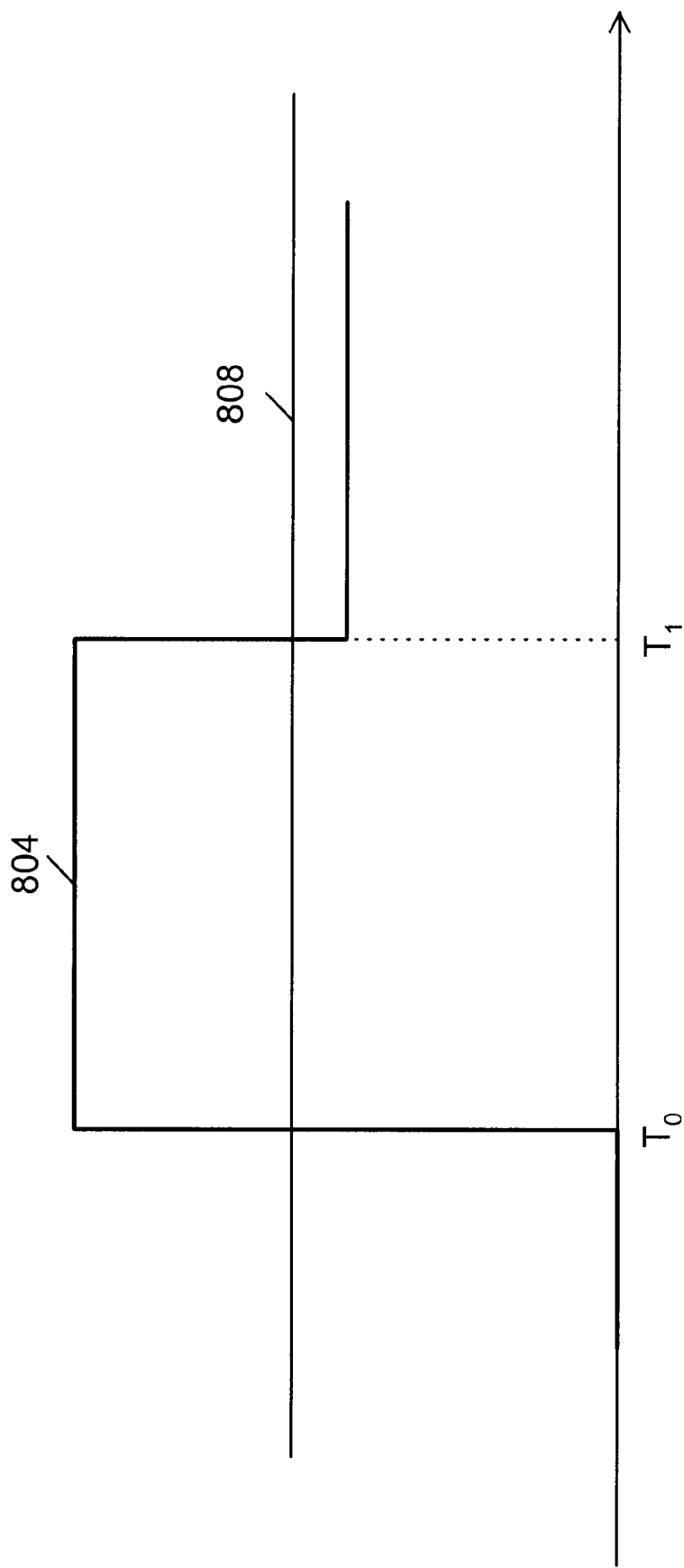
FIG. 8 shows a graphical representation of the power pulled by the load at the output terminal of the boost circuit of FIG. 1.

FIG. 8 shows a graphical representation of power $W_{out}$ at terminal $T_{Vout}$ in accordance with one embodiment. Line 804 represents power $W_{out}$. Line 808 represents the current limit of voltage generation circuit 110. Before time $t_0$, power $W_{out}$ is at 0W. From time $t_0$ to t1, power $W_{out}$ is at a high-voltage, high-current level, which, in one embodiment, is at 5V and 2.0A, respectively. After time $t_1$, power $W_{out}$ is a high-voltage, low current level, which, in one embodiment, is at 5V, and 200 mA, respectively. The electrical power between time $t_0$ and $t_1$, in one embodiment, is used to spin-up the disk drive.

Before time $t_0$, capacitor $C_{store}$ is charged. During time $t_0$ to $t_1$ $C_{store}$ is depleted. After time $t_1$, whenever current $I_{charge}$ in voltage generation circuit 110 is greater than the current required to provide the power needed by the disk drive, capacitor $C_{store}$ is again charged to allow further high current demands by the load.

In the foregoing specification, the invention has been described with reference to specific embodiments thereof However, it will be evident that various modifications and changes may be made thereto without departing from the broader spirit and scope of the invention. The specification and drawings are, accordingly, to be regarded as illustrative rather than as restrictive.

What is claimed is:

1. A circuit for converting available electrical power at a terminal $T_{Vin}$ to desirable electrical power at a terminal $T_{Vout}$, comprising:

a voltage generation circuit for receiving a voltage $V_{in}$ at terminal $T_{Vin}$ and providing a voltage $V_{store}$ and a current $I_{charge}$ at a terminal $T_{Vstore}$;

a capacitor $C_{store}$ connected to terminal $T_{Vstore}$, for storing charge for use by a boost regulator; the charge being generated by voltage $V_{store}$ and current $I_{charge}$;

a timing-control generator, based on $V_{in}$ and $V_{store}$, providing a timing-control signal $T_{control}$ for controlling the timing operation of the boost regulator; and the boost regulator, when in operation, based on voltage $V_{store}$ and a current $I_{store}$ at terminal $T_{Vstore}$, providing voltage $V_{out}$.

2. The circuit of claim 1 wherein current $I_{store}$ at terminal $T_{Vstore}$ does not exceed current $I_{in}$ at terminal $V_{in}$.

3. The circuit of claim 1 wherein signal $T_{control}$ resets the boost regulator until charge in capacitor $C_{store}$ is enough to provide the desirable electrical power at terminal $T_{Vout}$.

* * * * *